(12) United States Patent
Baker et al.

(10) Patent No.: US 7,044,803 B2
(45) Date of Patent: May 16, 2006

(54) HIGH DENSITY PATCHING SYSTEM WITH LONGFRAME JACKS

(75) Inventors: Scott K. Baker, Richfield, MN (US); Bruce R. Musolf, Eagan, MN (US); James Dewey, Plymouth, MN (US); Jeffrey L. Peters, Eagan, MN (US); Thomas Good, Mound, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/894,866

(22) Filed: Jul. 20, 2004

(65) Prior Publication Data

US 2006/0019548 A1  Jan. 26, 2006

(51) Int. Cl.
*H01R 24/04* (2006.01)
(52) U.S. Cl. ...................... 439/668; 439/188
(58) Field of Classification Search ................ 439/668, 439/669, 188, 189; 200/51.1
See application file for complete search history.

(56) References Cited

U.S. PATENT DOCUMENTS

| | | | | |
|---|---|---|---|---|
| 5,582,525 | A * | 12/1996 | Louwagie et al. | 439/668 |
| 5,879,197 | A * | 3/1999 | Dewey | 439/668 |
| 6,116,961 | A | 9/2000 | Henneberger et al. | 439/668 |
| 6,535,367 | B1 | 3/2003 | Carpenter et al. | 361/42 |
| 6,540,562 | B1 | 4/2003 | Baker et al. | 439/668 |
| 2002/0173188 | A1 | 11/2002 | Follingstad et al. | 439/188 |
| 2004/0067671 | A1 | 4/2004 | Eckhart | 439/188 |
| 2004/0077220 | A1 | 4/2004 | Musolf et al. | 439/668 |

* cited by examiner

*Primary Examiner*—Chandrika Prasad
(74) *Attorney, Agent, or Firm*—Merchant & Gould P.C.

(57) ABSTRACT

A patching system is disclosed herein. The patching system includes a plurality of front-loaded patching modules positionable within a chassis. Each of the patching modules includes first and second longframe jack assemblies and a switch for changing the circuit configurations of the patching module. The patching modules and the chassis provide increased patching density.

22 Claims, 11 Drawing Sheets

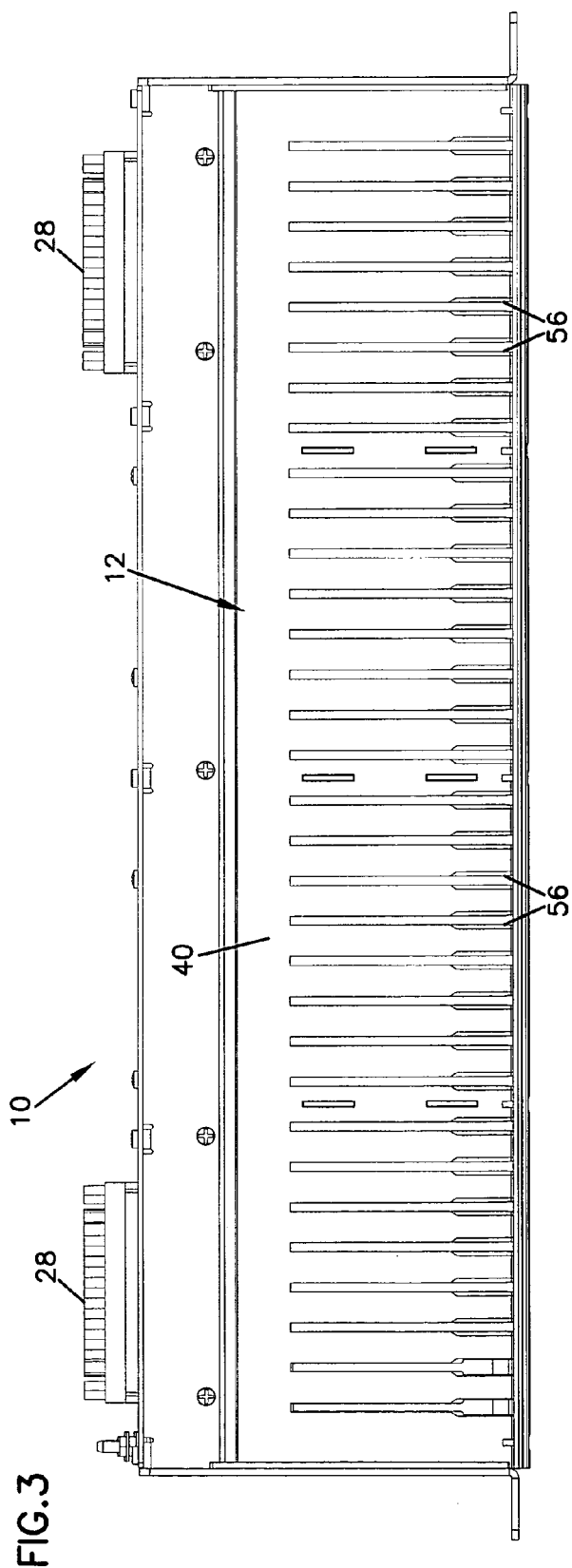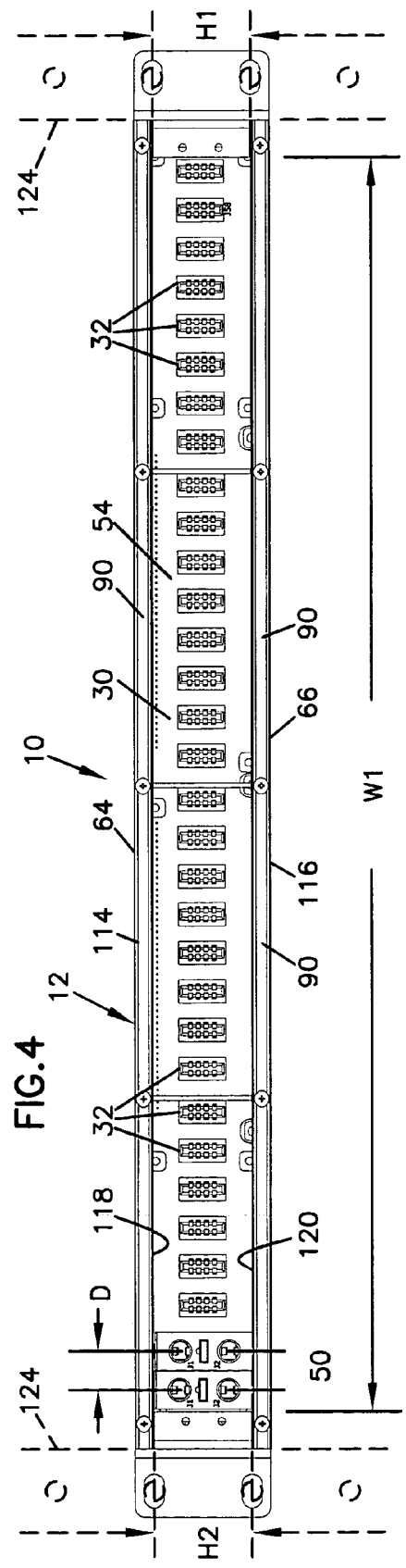

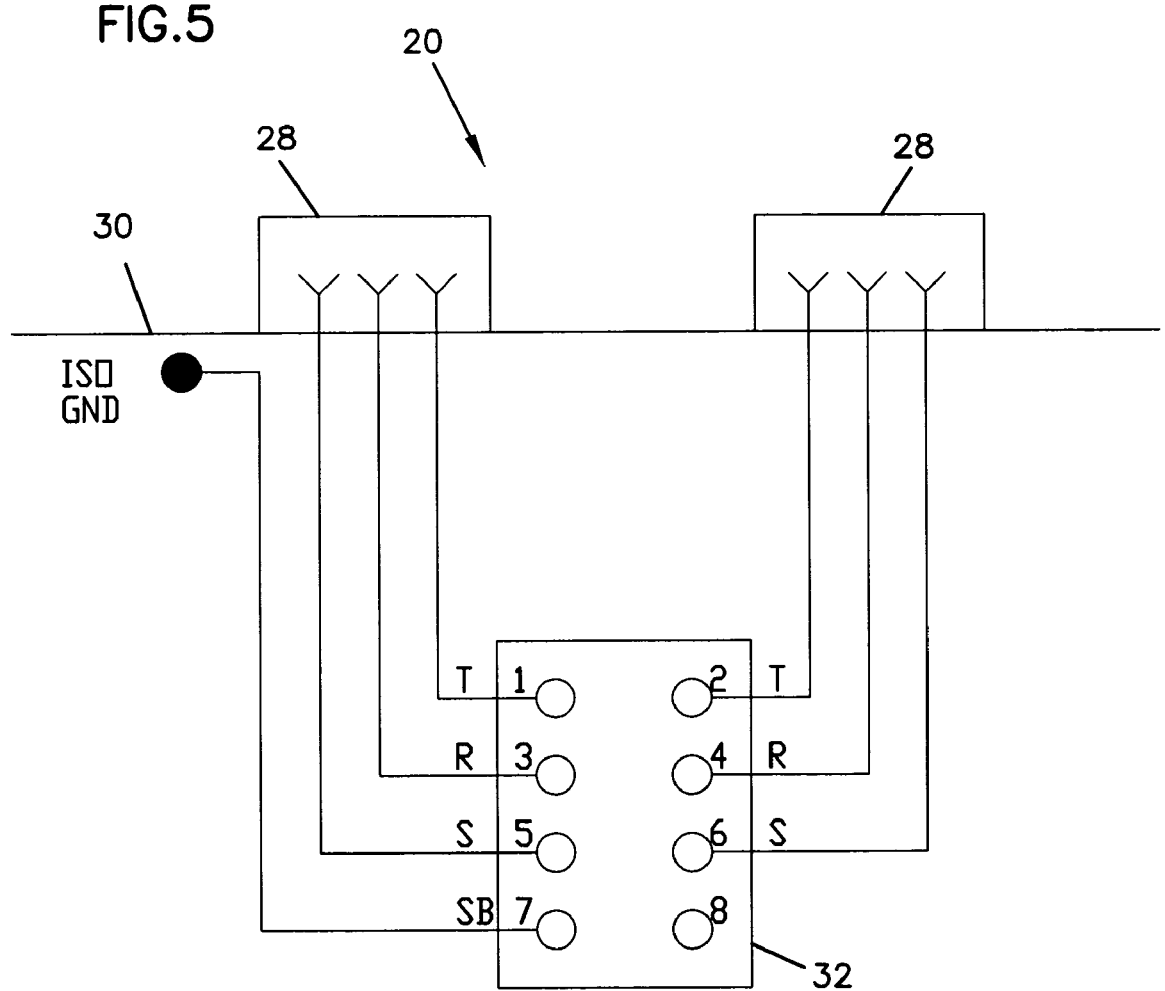

HIGH DENSITY PATCHING SYSTEM WITH LONGFRAME JACKS

FIELD OF THE INVENTION

The present invention relates to patching systems for audio, video or digital applications; in particular, the present invention relates to patching systems having longframe jacks.

BACKGROUND

In a professional audio and video industry application, a large number of cables are use to carry signals from sources to processing devices. The environment in which these signals are generated is quite dynamic and requires the ability to quickly and easily shift connections between the sources and the devices. A jack field provides this sort of connection flexibility.

A jack field is an array of jacks used to cross-patch analog and digital audio signals. The jack field also serves as a test or monitoring point for these same signals. A longframe jack is one traditional type of jack used in jack fields. These jacks were used in the early telephone switchboards. As suggested by the name, longframe jack are typically longer and larger in physical size than other jacks (e.g., bantum jacks). Traditional longframe jacks have a unified physical design configured to mate with a specific style of patch cord plug.

In providing a jack field, individual longframe jacks are mounted to a panel or chassis. Standards for density associated with a chassis are common to jack fields having longframe jacks. For example, a chassis typically has a standardized width. One jack field density requirement stipulates that the longframe jacks be horizontally mounted 0.625 inches center-to-center. That is, because of the standardized chassis width and the unified physical design of longframe jacks, conventional arrangements of longframe jack fields typically have a maximum density of 28 jacks and a center-to-center spacing of 0.625 inches.

In early applications, longframe jacks were provided with rear terminals that accepted wire-wrap connections or with terminals designed for soldering. Wiring the jacks, however, was very time consuming, and this labor formed a considerable part of the cost of such products. As an alternative to using wire, jack fields have been designed using printed circuit boards (PCBs) that connect the jacks to a desired rear interface (see U.S. Pat. No. 6,540,562).

Jack fields are used to connect pieces of equipment together and also to provide access locations for patching signals to or from the equipment and for providing monitoring functions. The jack fields typically include an array of jacks including a plurality of jack pairs. There are three principal circuit configurations for wiring jack pairs of a jack field, depending on the needs of the particular situation.

First, the jack pairs of a jack field may be set up in a "no-normal" circuit configuration, meaning that each jack of a pair of jacks is normally isolated from (i.e., not electrically connected to) the corresponding jack of the pair of jacks. In this configuration, the jacks do not provide normal connections between two pieces of equipment (e.g., a source and a destination device). Instead, the jacks merely provide patching access for connecting to a given piece of equipment by inserting a patch plug into the jack to which the piece of equipment is connected.

A second circuit configuration is referred to as "full-normal". In a full-normal configuration, normal springs corresponding to tip and ring springs of the first jack of a jack pair are electrically connected to normal springs corresponding to tip and ring springs of the second jack of the jack pair. In this configuration, the jacks provide normal connections between the pieces of equipment linked to the jacks. As an example, a source device and a destination device can be connected to the first and second jacks, respectively. When no plugs are inserted in the jacks, the jacks function to provide a connection between the source device and the destination device. When a plug is inserted into the first jack, the connection between the source device and the destination device is broken, and the plug is connected to the source device. When a plug is inserted into the second jack, the connection between the source device and the destination device is broken and the plug is connected to the destination device. So, in a full-normal configured jack field, two elements can be configured to be normally electronically connected to one another but that normal connection can be broken and the connections redirected as necessary.

A third circuit configuration is referred to as "half-normal". In a half-normal configuration, the tip and ring springs of the first jack of a jack pair are electrically connected to the normal springs of the second jack of the jack pairs. In use, a first piece of equipment is connected to the first jack and a second piece of equipment is connected to the second jack. Normally (i.e., when no plugs are inserted in the jacks) the jacks are configured to electrically connect the first piece of equipment to the second piece of equipment. A plug is inserted into the first jack to provide monitor access without breaking the connection between the two pieces of equipment. When a plug is inserted in the second jack, the normal connection between the piece of equipment is broken and the plug is connected to the second piece of equipment.

Another aspect of the connection between jacks and devices connected to the jacks is the treatment of a shield ground used to reduce the impact of external electromagnetic inference on the signal being transmitted over a cable. Typically, the grounds of a pair of jacks can be isolated, looped together, or linked to a common bus.

What is needed are systems for increasing the density of longframe jack fields. What is also needed are systems for facilitating programming of longframe jack fields between the various circuit configurations.

SUMMARY

One aspect of the present disclosure relates to a patching module. The patching module includes a housing defining a first port and a second port. A first longframe jack assembly is positioned adjacent to the first port, and a second longframe jack assembly is positioned adjacent to the second port. Each of the first and second ports is sized to receive a longframe patch cord plug.

Another aspect of the present disclosure relates to a patching system. The patching system includes a chassis and a plurality of front-loaded patching modules. The plurality of front-loaded patching modules is positioned within a front opening defined in the chassis. Each of the patching modules includes a first longframe jack assembly, and a second longframe jack assembly. The system also includes a plurality of rear connectors electrically connected to the front-loaded patching modules.

A variety of other inventive aspects of the disclosure are set forth in part in the description that follows, and in part will be apparent from the description, or may be learned by practicing the inventive aspects. The inventive aspects relate to individual features as well as combinations of features. It is to be understood that both the foregoing general description and the following detailed description are exemplary and explanatory only and are not restrictive of the invention as claimed.

BRIEF DESCRIPTION OF THE DRAWINGS

FIG. 3 is a top plan view of the patching system of FIG. 1;

FIG. 4 is a front elevation view of the patching system of FIG. 1;

FIG. 5 is a schematic depiction of the chassis rear interface of the patching system of FIG. 1;

DETAILED DESCRIPTION

In the following detailed description, references are made to the accompanying drawings that depict various embodiments in which the inventive aspects may be practiced. It is to be understood that other embodiments may be utilized, and structural and functional changes may be made without departing from the scope of the inventive aspects.

Figure 1:
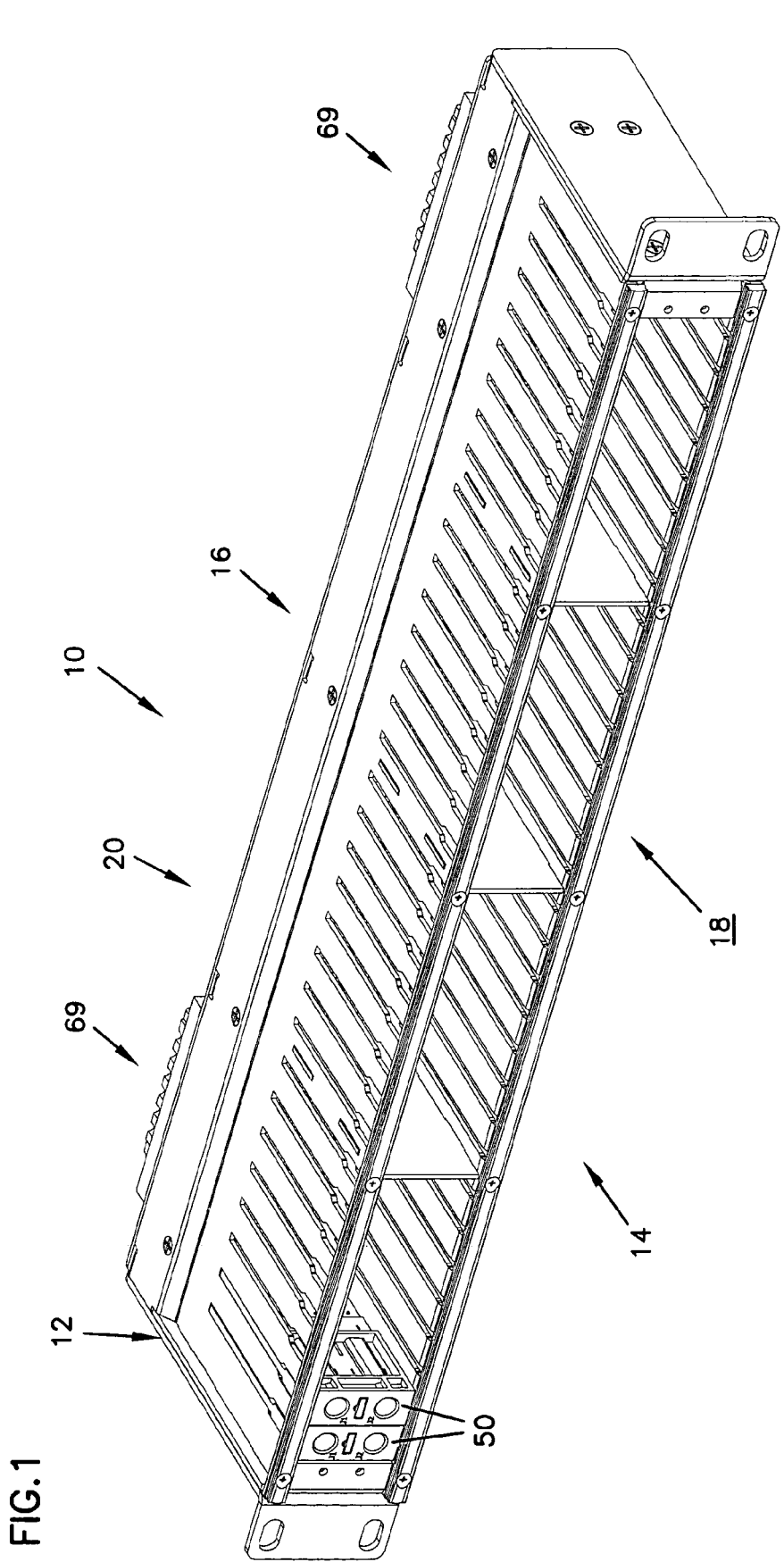
FIG. 1 is a front perspective view of a patching system having inventive aspects in accordance with the principles of the present disclosure.
Figure 2:
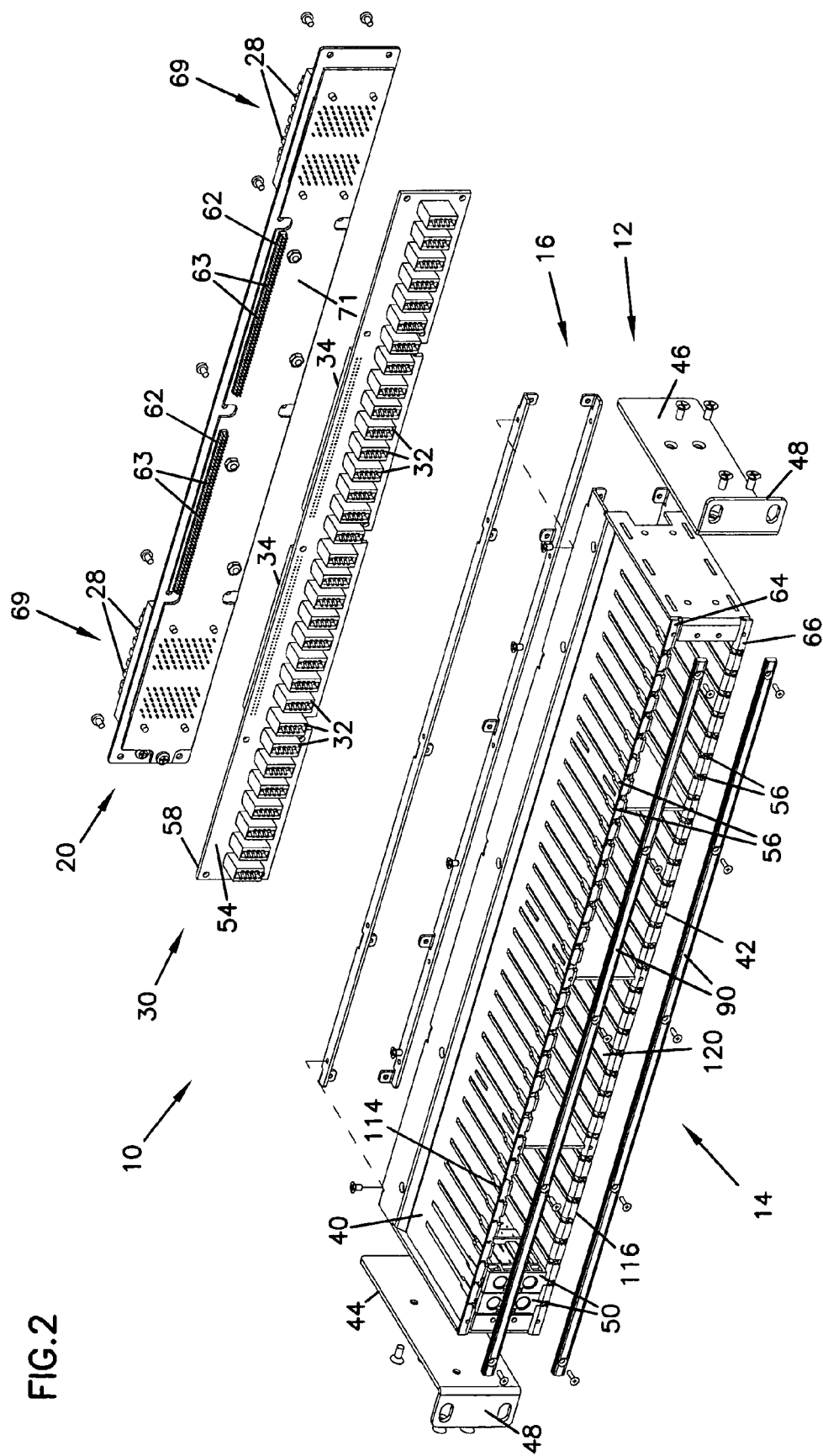
FIG. 2 is an exploded, front perspective view of the patching system of FIG. 1.

FIG. 1 illustrates a patching system 10 having features that are examples of inventive aspects in accordance with the principles of the present disclosure. The patching system 10 includes a chassis 12 having a front side 14 and a rear side 16. The front side 14 of the chassis 12 defines a front opening 18. The front opening 18 is sized to receive a plurality of front-loaded patching modules 50. In particular, the patching modules 50 are front-loaded by inserting the modules 50 through the front side 14 of the chassis 12 toward the rear side 16 for placement within the chassis 12. Each of the front-loaded patching modules 50 includes a first longframe jack assembly 22 (FIG. 6) and a second longframe jack assembly 24. A rear connector assembly 20 is accessible from the rear side 16 of the chassis 12. Referring to FIG. 2, the patching system 10 further includes a midplane board 30 that mounts to the rear side 16 of the chassis 12. The mid-plane board 30 provides an electrical interface between the rear connector assembly 20 and the front-loaded patching modules 50.

A. Chassis

Referring still to FIG. 2, the chassis 12 of the present patching system 10 has a generally rectangular configuration and includes a top wall 40, a bottom wall 42, a left wall 44 and a right wall 46. The front and rear sides 14, 16 of the chassis 12 are generally open. Flanges 48 extend outward from the left and right walls 44, 46. The flanges 48 are used to secure the chassis 12 to a rack or frame 124 (schematically represented in FIG. 4).

The front opening 18 of the chassis 12 is defined by the top and bottom walls 40, 42. The top wall 40 includes a top flange 64 and the bottom wall includes a bottom flange 66. Referring to FIG. 4, the chassis 12 generally has an overall front height H1, and a front opening height H2. The front height H1 of the chassis is generally defined between edges 114, 116 of the top flange 64 and the bottom flange 66. Preferably, the front height H1 is about 1.75 inches, as is standard in typical patching system applications so as to occupy at most one rack unit. A rack unit is the space provided by the telecommunications rack 124 at which one chassis having a front height of 1.75 inches can be mounted. If a chassis were configured with a height greater than 1.75 inches, the chassis would occupy more than one rack unit possibly resulting in an inefficient use of rack space.

The front opening height H2 of the chassis 12 is generally defined between inner surfaces 118, 120 of the top and bottom walls 40, 42. Preferably, the front opening height H2 is between 0.975 and 1.5 inches; more preferably the front opening height H2 is equal to or greater than about 1.25 inches. The chassis 12 defines a ratio associated with the front height H1 and the front opening height H2 of the chassis. In one embodiment, the ratio of the front height H1 and the front opening height H2 is no more than 1.8 to 1. In another embodiment, the ratio is less than or equal to about 1.6 to 1; and more preferably, the ratio is less than or equal to about 1.4 to 1. In yet another embodiment, the ratio is less than or equal to about 1.2 to 1.

In the illustrated embodiment, the chassis 12 is sized so that the chassis can be mounted into existing racks if needed. Typically, existing racks are configured to accept rows of chassis or panels, each of the panels being approximately 1.75 inches in height. The chassis 12 of the present disclosure is designed to mount within existing racks while providing a more dense population of longframe jack assemblies than what is found in conventional applications. In one embodiment, the chassis 12 is configured to accept at least 30 front-loaded patching modules 50; in another embodiment, the chassis 12 accepts at least 32 front-loaded patching modules.

Figure 7:
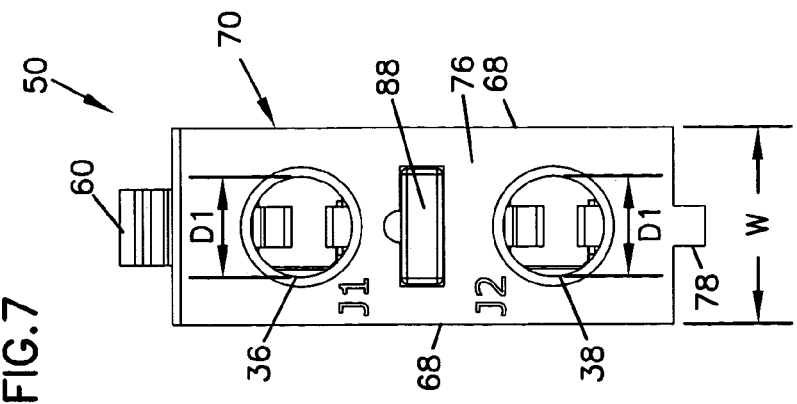
FIG. 7 is a front elevation view of the patching module of FIG. 6.

Referring now to FIG. 7, to provide the more densely populated patching system 10, each of the patching modules 50 has an overall width W configured to permit placement of the preferred number of patching modules within the opening 18 of the chassis 12. The width W of the patching module 50 is defined between sides 68 of the module 50. Preferably, the width W is less than 0.5 inches; more preferably, the width W is less than 0.4 inches. Accordingly, as shown in FIG. 4, the patching system 10 provides a center-to-center spacing D between the plurality of front-loaded patching modules 50 that is preferably equal to or less than 0.5 inches; more preferably equal to or less than 0.4 inches.

To accommodate at least 32 front-loaded patching modules 50, as illustrated in FIG. 4, the opening 18 of the chassis 12 has a width W1. The width can be about 12.8 inches to accommodate 32 patching modules 50 having a width W of less than 0.4 inches, or can be about 16.0 inches to accommodate 32 patching modules 50 having a width W of less than 0.5 inches.

Referring to FIGS. 2 and 3, the chassis 12 includes structure for facilitating receipt/insertion of the patching modules 50. In particular, the top and bottom walls 40, 42 of the chassis 12 define opposing slots 56. The opposing slots 56 guide the patching modules 50 into the proper orientation and location when the patching modules 50 are inserted into the front opening 18 of the chassis 12. Cover panels 90 can be mounted to the front of the chassis 12 at the top and bottom flanges 64, 66 of the top and bottom walls 40, 42. As shown in FIG. 4, the panels 90 provide a forwardly facing location for placement of designation labels or other indicia, for example.

B. Mid-Plane Board

Referring now to FIGS. 2 and 4, the mid-plane board 30 is aligned perpendicular relative to a direction of insertion of the patching modules 50, and includes a front side 54 positioned opposite a rear side 58. Jack interface connectors 32 are mounted in a horizontal row across the front side 54 of the mid-plane board 30. The jack interface connectors 32 are adapted to mate with corresponding rear connectors 52 (FIGS. 6 and 8) of the patching modules 50. When the mid-plane board 30 is mounted at the rear side 16 of the chassis 12, the jack interface connectors 32 project into the interior of the chassis and align with the sets of slots 56 of the chassis 12. The alignment between the slots 56 and the jack interface connectors 32 ensures that when a patching module 50 is inserted within a set of the slots 56, the rear connector 52 of the patching module 50 will mate with the corresponding jack interface connector 32 of the mid-plane board 30.

Referring still to FIG. 2, rear module interface connectors 34 are mounted at the rear side 58 of the mid-plane board 30. The rear module interface connectors 34 are adapted to mate with corresponding rear module connectors 62 of the rear connector assembly 20. For example, the rear module interface connectors 34 can include two rows of sockets (not shown) adapted to receive corresponding conductive pins 63 of the rear module connectors 62. The jack interface connectors 32 are electrically connected to the rear module interface connectors 34 by tracings provided on the mid-plane board 30.

C. Rear Connector Assembly

Referring still to FIG. 2, the rear connector assembly 20 includes rear modules 69. The rear modules 69 include rear connectors 28. In the illustrated embodiment, the rear connectors 28 are 90-pin connectors. It will be appreciated that other rear connector types could also be used. The rear connectors 28 are electrically connected to corresponding pins 63 of the connectors 62 by tracings provided on a circuit board 71. In the illustrated embodiment, the patching system 10 includes a single circuit board 71. In alternative embodiments, the single circuit board 70 could be replaced with multiple circuit boards.

FIG. 5 is a schematic representation of the rear interface of the chassis, that is, the rear connector assembly 20, showing schematically that the jack interface connectors 32 are electrically connected to the rear connectors 28.

D. Patching Module

FIGS. 6–9 illustrate one of the patching modules 50 in isolation from the patching system 10. The patching module 50 includes a dielectric body or housing 70 having a front end 72 and a back end 74. A face panel 76 is located at the front end 72, and the rear jack connector 52 is located at the back end 74. The dielectric housing 70 also defines top and bottom guides 78. The top and bottom guides 78 are sized to slide within the slots 56 of the chassis 12. A flexible tab 60 is provided toward the front end 72 of the housing 70 to secure the patching module 50 within the chassis 12. In the illustrated embodiment, the flexible tab 60 is formed as an integral component of the housing 70. The flexible tab 60 permits a user to detachably secure the patching module 50 to the chassis 12 by a snap-fit connection.

Figure 6:
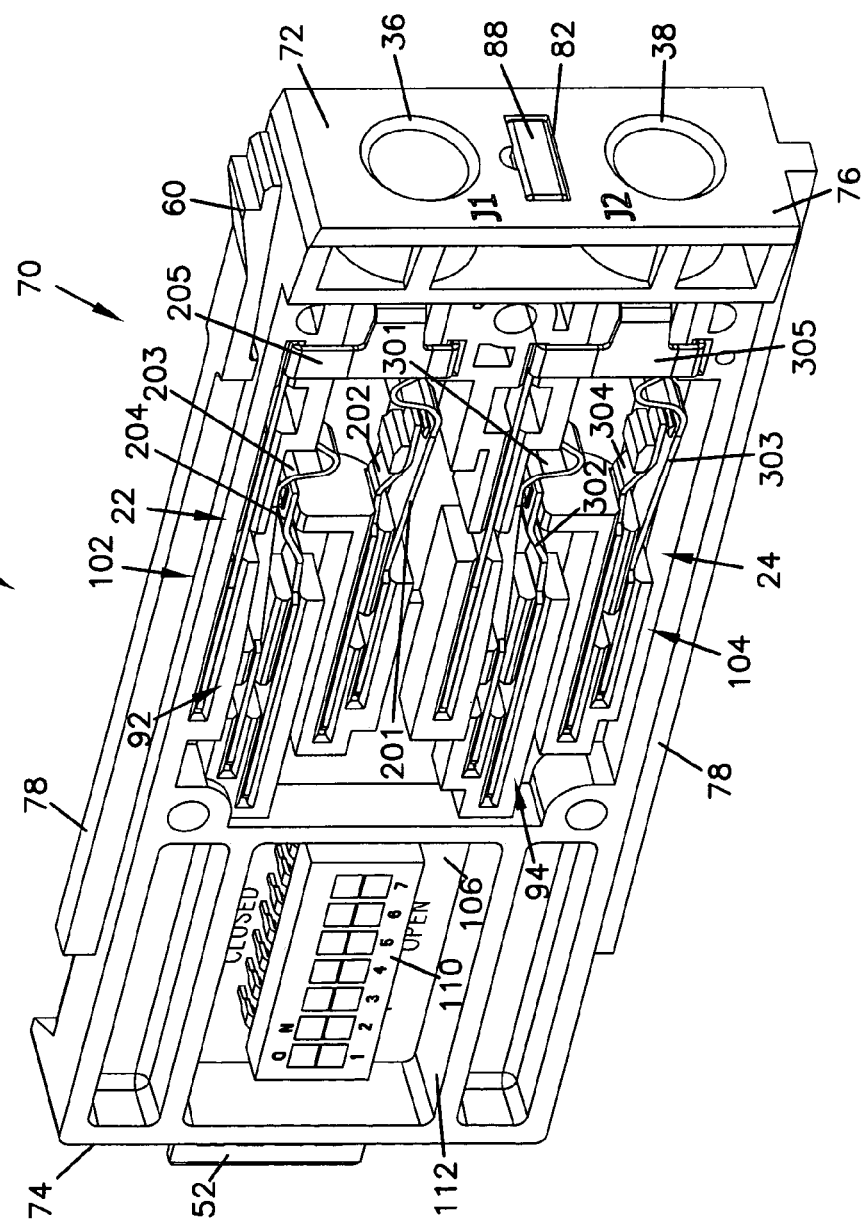
FIG. 6 is a side perspective view of one embodiment of a patching module of the patching system of FIGS. 1–4, shown with a side panel removed.

Referring to FIGS. 6 and 7, the face panel 76 of the housing defines openings or ports, including a first upper port 36 and a second lower port 38. In the illustrated embodiment, the patching module 50 includes only the first and second jack assemblies 22, 24; accordingly, the face panel 76 defines only two ports. The ports 36, 38 are sized for receiving longframe patch cord plugs. Longframe patch cord plugs are typcially standardized plugs that have a particular plug configuration. Accordingly, the ports 36, 38 preferably correspond to the standardized shape and configuration of the longframe patch cord plugs. In particular, each of the ports 36, 38 has a diameter D1 of approximately 0.25 inches to correspond to the standard diameter of a longframe patch cord plug.

The face panel 76 of the dielectric housing 70 also defines a structure 82 configured for receipt of a tool (not shown) to assist in inserting and removing the patching module 50 from the chassis 12. In the illustrated embodiment, the structure 82 is an aperture formed in the face panel 76 of the housing 70. An end of the tool is inserted into the aperture to either push the module 50 into the chassis 12, or pull the module from the chassis 12. In addition, the structure 82 can be used as a placement holder for a configuration identifier. That is, as shown in the illustrated embodiment of FIG. 6, an indicator or identifier piece 88 corresponding to the particular electrical configuration of the module can be inserted into the structure 82 to clearly indicate to the user whether the module is, for example, a no-normal, a full-normal, or a half-normal module. The indicator can be color-coded.

Referring still to FIG. 6, the first longframe jack assemblies 22 includes a first spring assembly 102 having a plurality of contact springs, and the second longframe jack assembly 24 includes a second spring assembly 104 also having a plurality of contact springs. The housing 70 is adapted for holding/supporting the plurality of contact springs of each of the first and second jack assemblies. In particular, the dielectric housing 70 defines upper and lower spring mounting regions 92, 94. The first and second spring assemblies 102, 104 of the first and second longframe jack assemblies 22, 24 are respectively mounted at the upper and lower spring mounting regions 92, 94. Each of the first and second spring assemblies 102, 104 respectively includes a tip spring 201, 301, a normal spring 202, 302 corresponding to the tip spring 201, 301, a ring spring 203, 303 and a normal spring 204, 304 corresponding to the ring spring 203, 303. The spring assemblies 102, 104 also each respectively include sleeve ground springs 205, 305.

The first spring assembly 102 is located adjacent to the upper port 36 of the housing 70. The second spring assembly 104 is located adjacent to the lower port 38 of the housing 70. The tip and ring springs 201, 203 are positioned such that when a longframe patch cord plug (not shown) is inserted within the upper port 36, the springs 201, 203 are disconnected from their corresponding normal contacts 202, 204 and connect to the plug. Concurrently, the sleeve ground spring 205 contacts a sleeve ground of the plug inserted within the port 36. It will be appreciated that the second spring assembly 104 operates in a similar manner. For example, when a longframe patch cord plug is inserted within the lower port 38, the tip and ring springs 301, 303 are disconnected from their corresponding normal springs 302, 304 and connect to the plug. Concurrently, the sleeve ground 305 is electrically connected to a sleeve ground of the plug.

Figure 8:
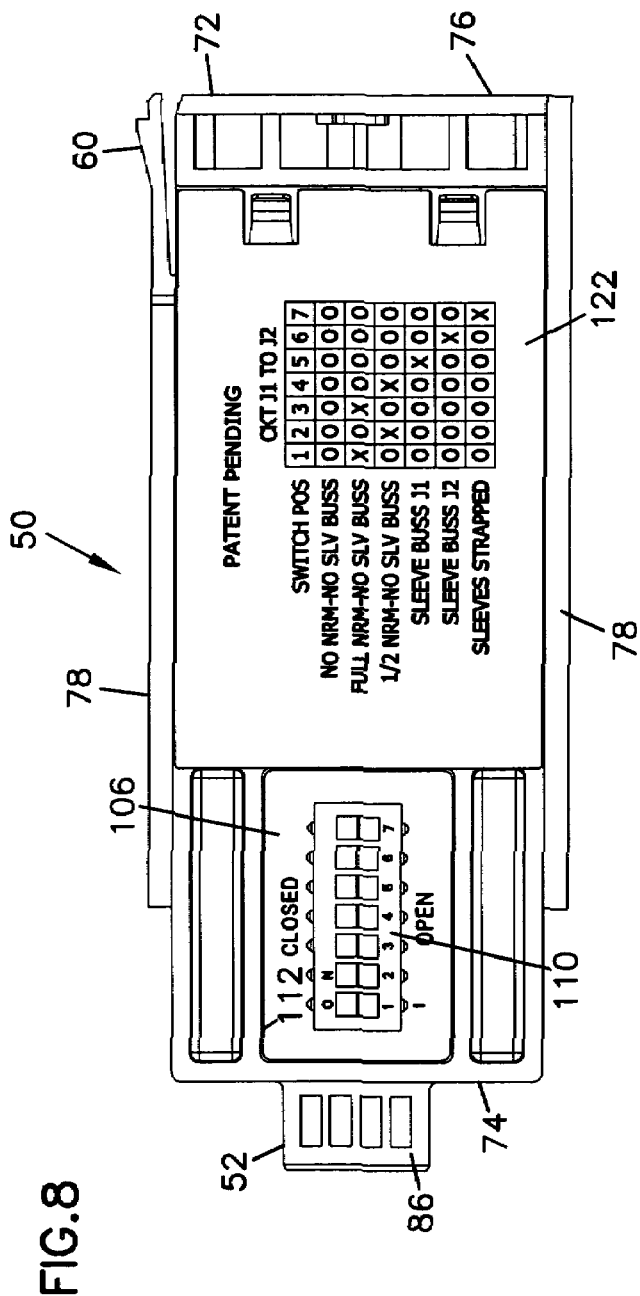
FIG. 8 is side view of the patching module of FIG. 6, shown with a side panel installed.
Figure 9:
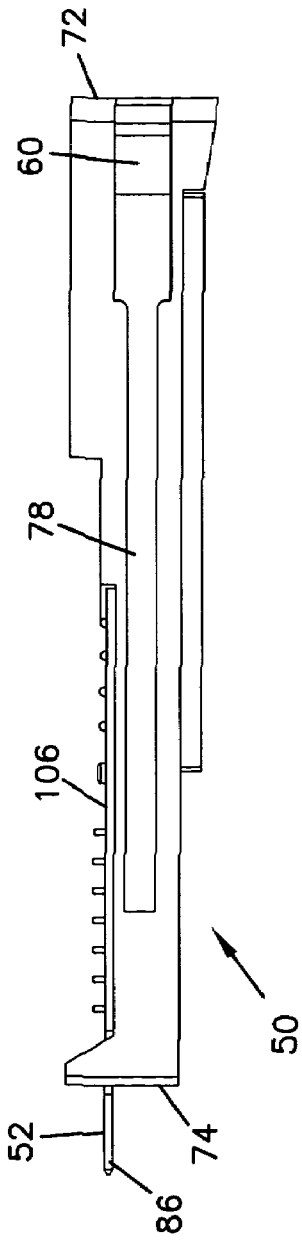
FIG. 9 is a top plan view of the patching module of FIG. 6.

The springs 201–205, 301–305 can be secured within the upper and lower spring mounting regions 92, 94 the housing 70 by any number of known techniques. As shown in FIG. 6, the springs 201–205, 301–305 are press fit within channels or slots formed in the housing 70. The springs 201–205, 301–305 have post ends (not shown) that terminated at a circuit board 106 (also shown schematically in FIGS. 10–14). The circuit board 106 provides electrical connections between the springs 201–205, 301–305 and the rear connector 52. As shown in FIGS. 8 and 9, the rear connector 52 of the illustrated patching module 50 is a card edge connector 86. Other types of rear connectors 52 and corresponding jack interface connectors 32 can be used. The rear connectors 52 and the jack interface connector 32 provide electrical communication between the first and second longframe jack assemblies 22, 24 and the mid-plane board 30.

It is preferred for all of the components of the dielectric housing 70 to be integrally molded or formed as a single unitary piece. For example, it is preferred that the face panel 76, the flexible tab 60, the slots and channels of the spring mounting regions 92, 94, the upper and lower ports 36, 38, and the guides 78 be molded as a single unitary piece of dielectric material (e.g., plastic).

The patching module 50 of the present disclosure includes a switching device 110. As described in greater detail hereinafter, the circuit board 106 electrically connects the card edge connector 86 and the springs 201–205, 301–305 to the switching device 110 for changing the circuit configuration of the patching module 50 between a mo-normal configuration (see FIG. 10), a half-normal configuration (see FIG. 11), and a full-normal configuration (see FIG. 12). The switching device 110 also allows the patching module 50 to be switched to a bussed ground configuration (see FIG. 13) and a looped ground configuration (see FIG. 14). As shown in FIGS. 6 and 8, the dielectric housing 70 defines a window 112 for providing access to the switching device 110 from the left side of the patching module 50. The window 112 allows a user to easily change the circuit configuration of the patching module 50 by changing the settings of the switching device 110. Indicia, shown in FIG. 8, can be located on a side panel 122 to aid a user in modifying the circuit configuration of the patching module 50.

Referring back to FIG. 6, the switching device 110 is depicted as a DIP switch having 7 two-position switches. It will be appreciated that other types of switches (e.g., dial switches, rotary switches, multi-position switches, etc.) can also be used. A jack device having a switching device is also disclosed in U.S. application Ser. No. 10/278,063, filed Oct. 21, 2002, which is hereby incorporated by reference in its entirety.

E. Circuit Configurations

Figure 10:
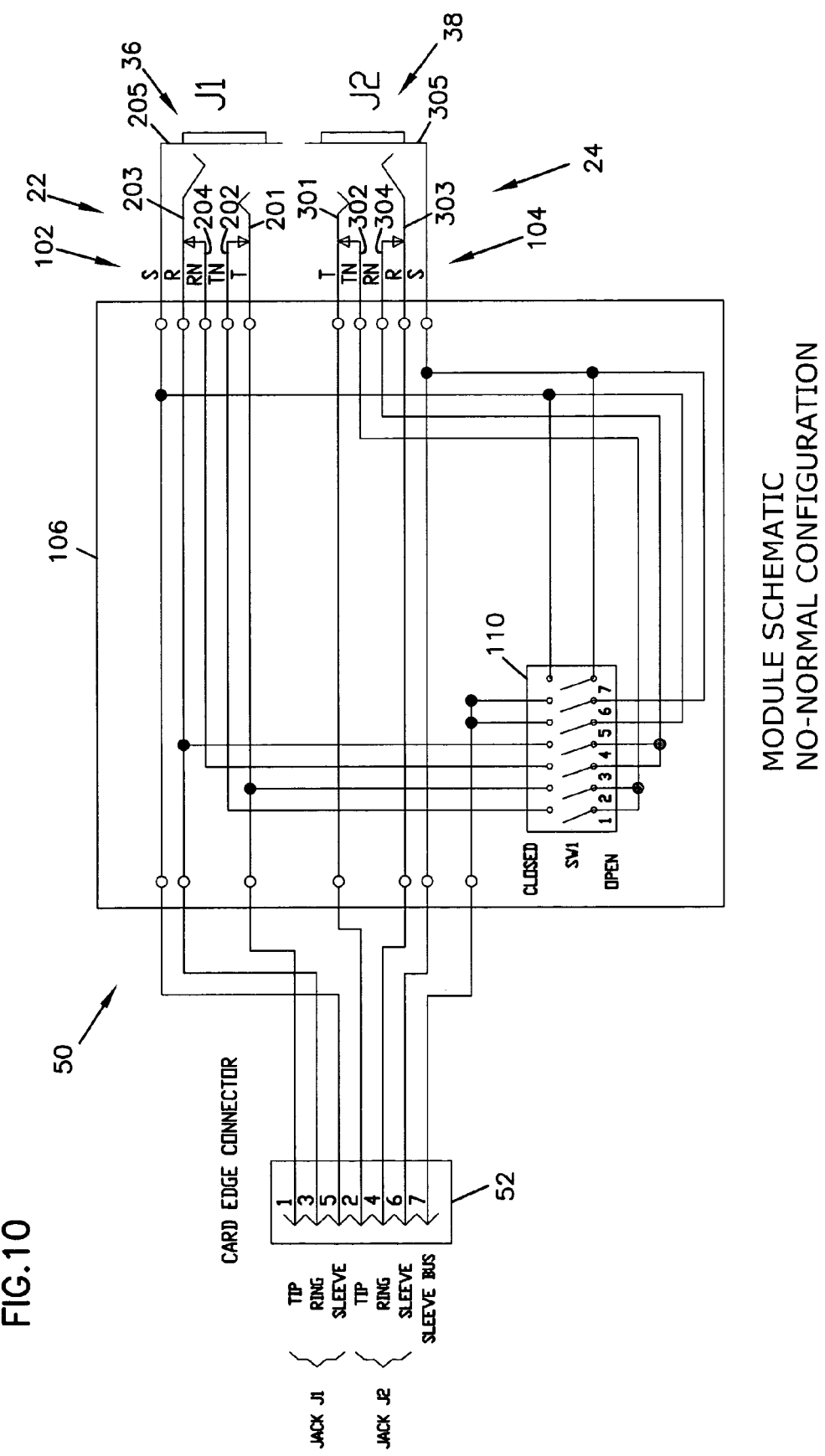
FIG. 10 is a schematic depiction of the patching module of FIG. 6, shown in a no-normal circuit configuration.

FIG. 10 shows the patching module 50 in a no-normal configuration. In this configuration, all of the switches of the switching device 110 are open such that no electrical connection is provided between the two longframe jack assemblies 22, 24. Thus, in this configuration, the patching module 50 merely provides patching capabilities.

Figure 11:
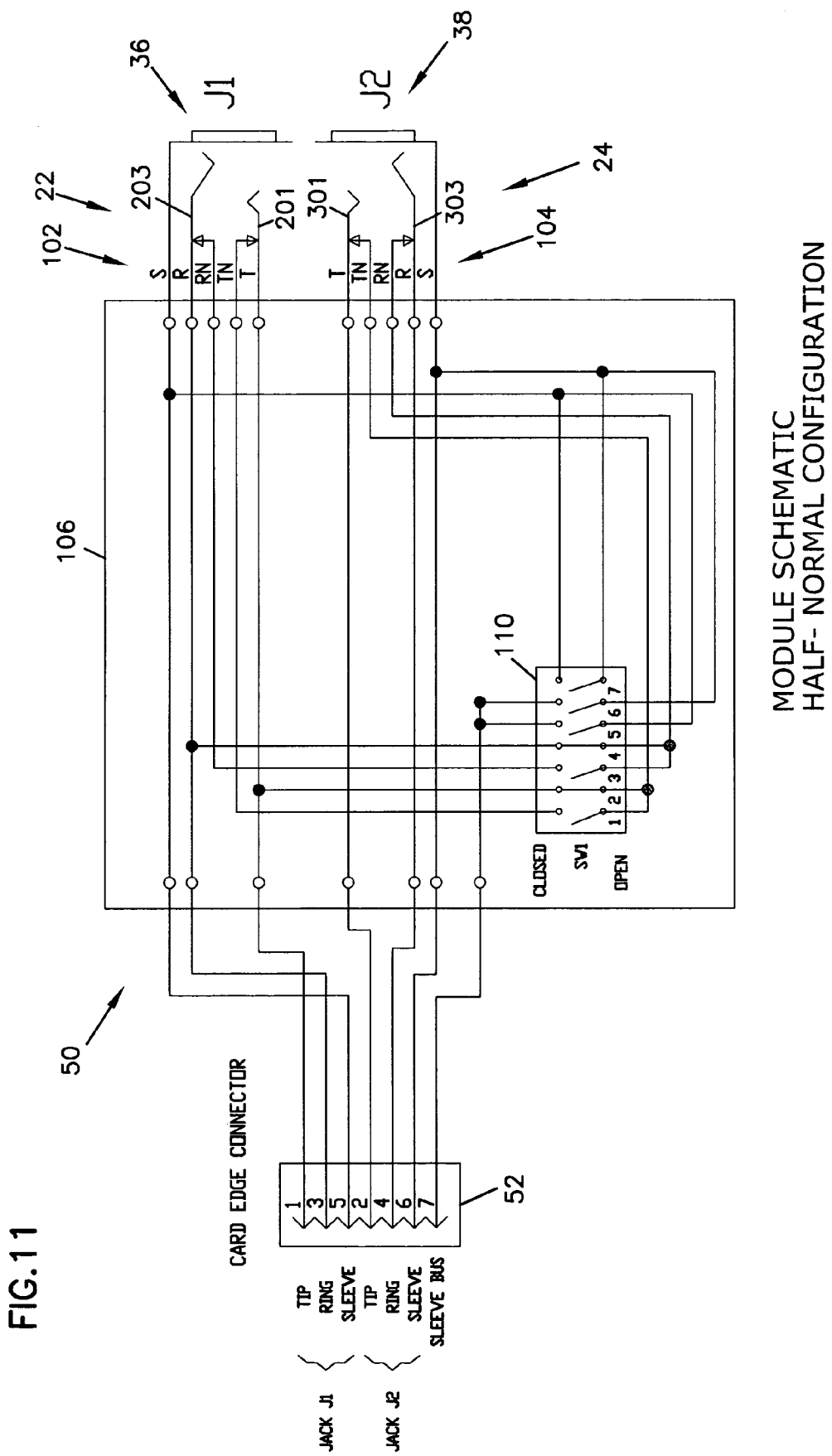
FIG. 11 is a schematic depiction of the patching module of FIG. 6, shown in a half-normal circuit configuration.

FIG. 11 shows the patching module 50 in a half-normal circuit configuration. In this configuration, switches 2 and 4 of the switching device 110 have been closed. With switches 2 and 4 closed, contacts C1, C3, which are associated with the first longframe jack assembly 22, are electrically connected to contacts C2, C4 through the second longframe jack assembly 24. In this configuration, signals traveling through the patching module 50 can be monitored without interruption by inserting a longrame patch cord plug into the upper port 36. By inserting a longframe patch cord plug into the lower port 38, the connection between contacts C3, C5 and contacts C2, C4 is broken, and the longframe patch cord plug is electrically connected to contacts C2, C4.

Figure 12:
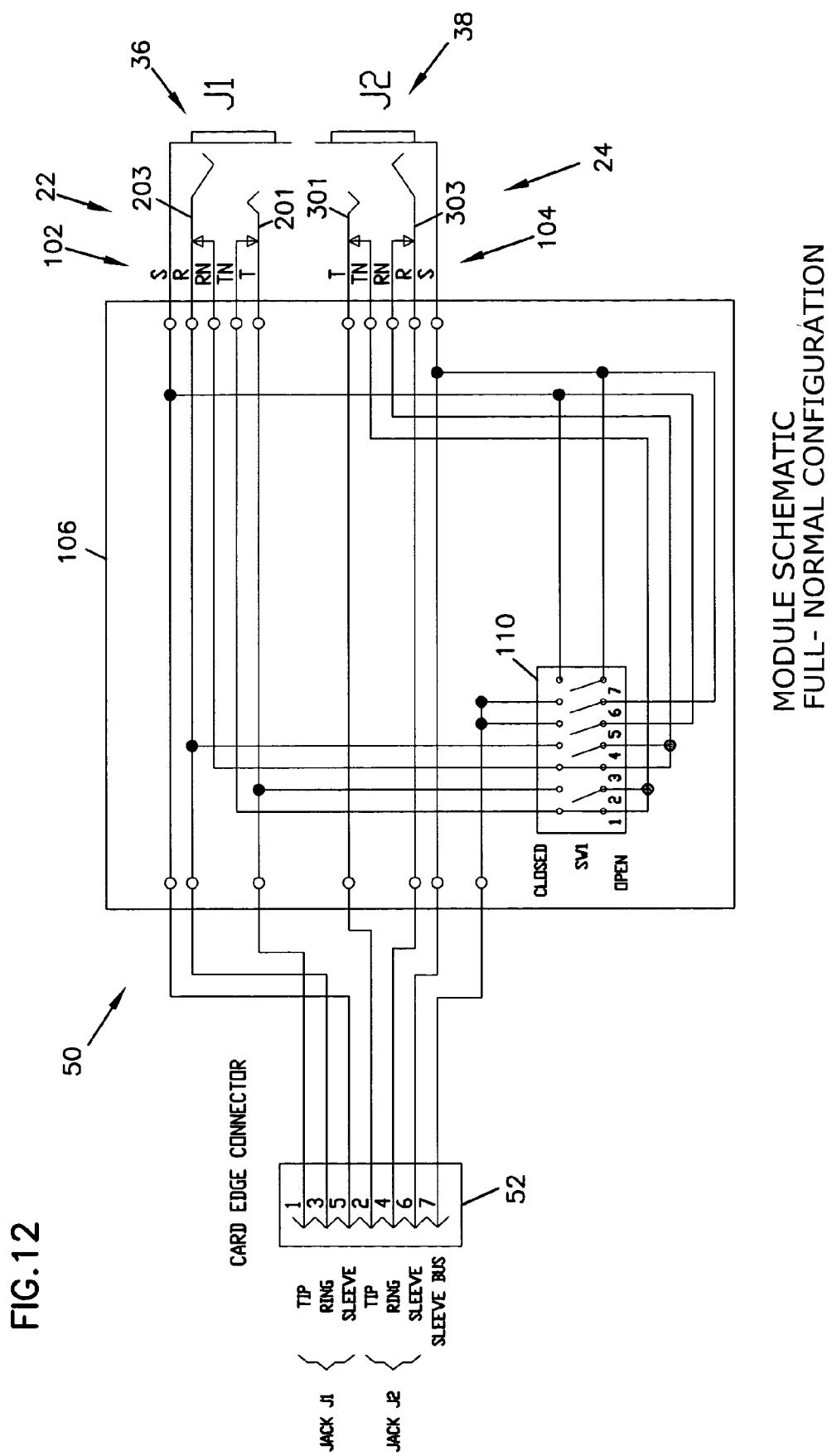
FIG. 12 is a schematic depiction of the patching module of FIG. 6, shown in a full-normal circuit configuration.

FIG. 12 shows the patching module 50 in a full-normal circuit configuration in which switches 1 and 3 are closed. In this configuration, contacts C1, C3 are interconnected to contacts C2, C4 through both of the longframe jack assemblies 22, 24. In the full-normal configuration, the connection between contacts C1, C3 and contacts C2, C4 can be broken by inserting a longframe patch cord plug into either of the upper and lower ports 36, 38. When a longframe patch cord plug is inserted into the upper port 36, the connection between contacts C1, C3 and C2, C4 is broken, and a longframe patch cord plug connection is made with contacts C1, C3. When a longframe patch cord plug is inserted into the lower port 38, the connection between contacts C1, C3 and contacts C2, C4 is broken, and a longframe patch cord plug connection is made with contacts C2, C4.

Figure 13:
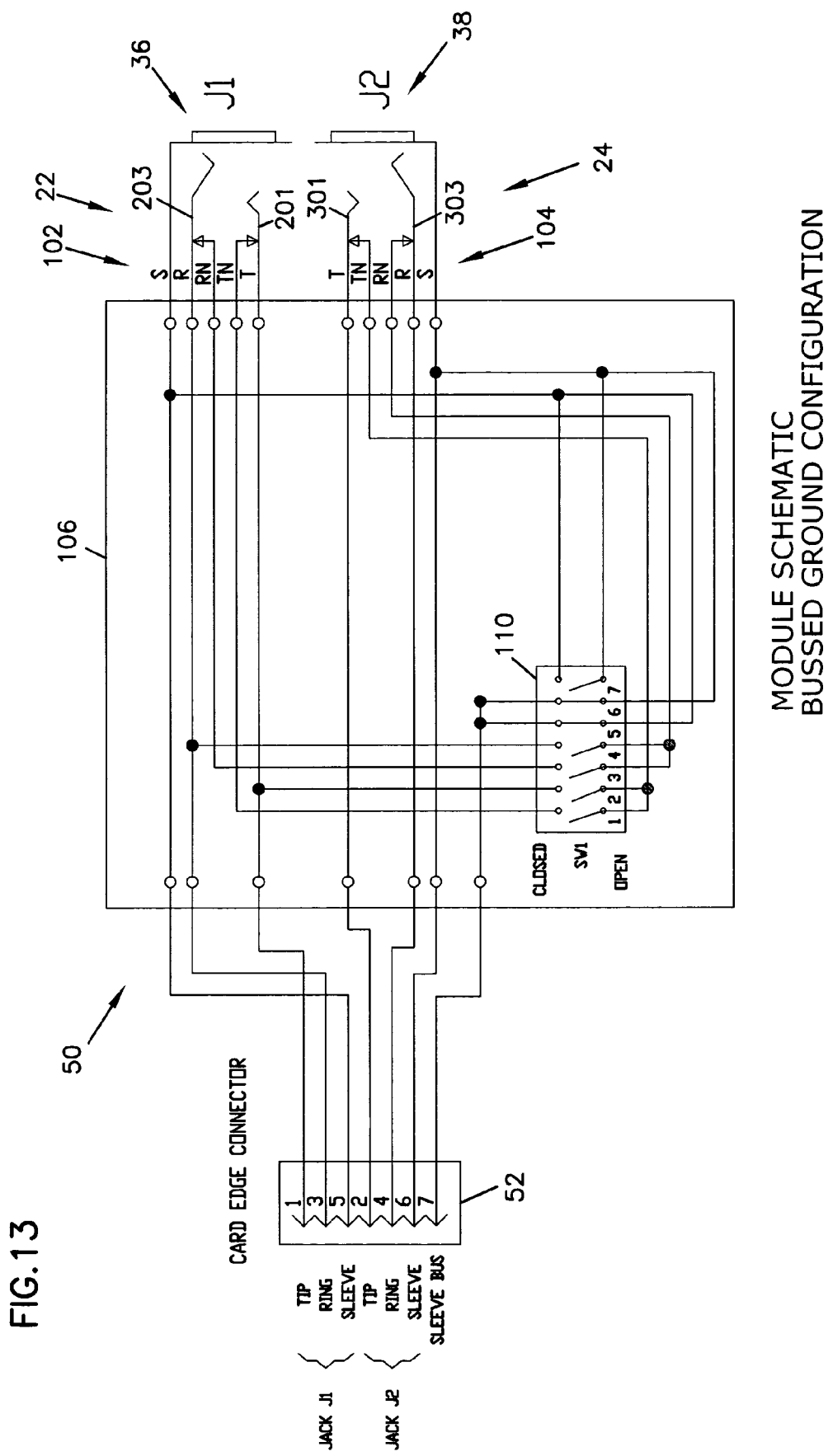
FIG. 13 is a schematic depiction of the patching module of FIG. 6, shown in a bussed ground configuration.

FIG. 13 shows the patching module 50 in a bussed ground circuit configuration. In this configuration, switches 5 and 6 of the switching device 110 are closed. With switches 5 and 6 closed, the two sleeve ground springs 205, 305 are electrically connected to a sleeve bus pin C7 of the rear connector. This type of configuration allows multiple sleeve ground springs to be linked (i.e., daisy-chained) together to a common ground for convenience.

Figure 14:
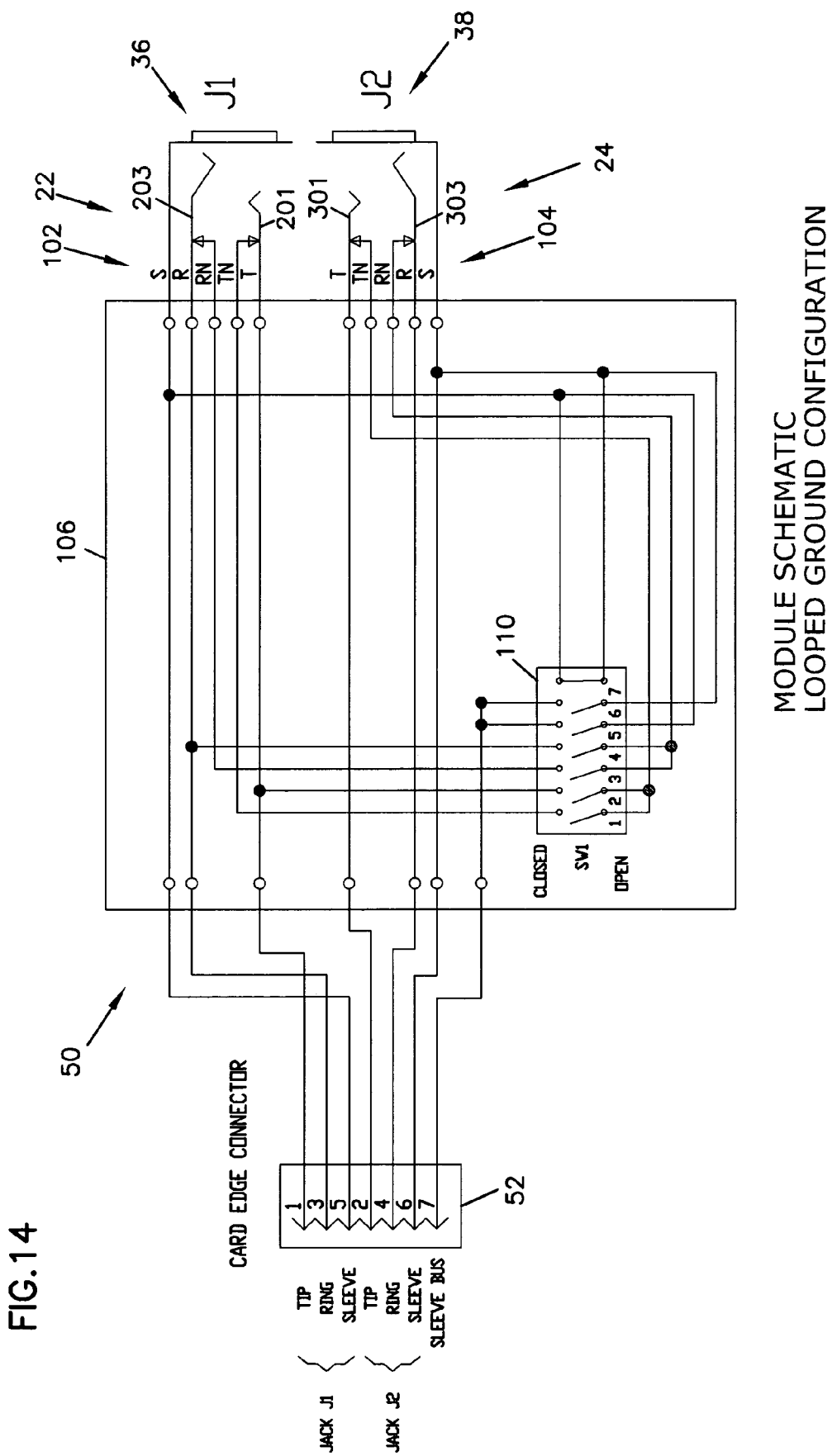
FIG. 14 is a schematic depiction of the patching module of FIG. 6, shown in a looped ground configuration.

FIG. 14 shows the patching module 50 in a looped ground configuration. In this configuration, switch 7 of the switching device 110 is closed. With switch 7 closed, the two ground springs 205, 305 are electrically connected to one anther without being connected to the bus line.

Since many embodiments of the invention can be made without departing from the spirit and scope of the invention, the invention resides in the claims hereinafter appended.

We claim:

1. A patching module, comprising:
   a housing defining only two ports, including a first port and a second port;
   a first longframe jack assembly positioned adjacent to the first port, the first longframe jack assembly including a first spring arrangement supported by the housing;
   a second longframe jack assembly positioned adjacent to the second port, the second longframe jack assembly including a second spring arrangement supported by the housing;
   wherein each of the first and second ports is sized to receive a longframe patch cord plug.

2. The patching module of claim 1, wherein each of the first and second ports has a diameter, the diameter being approximately 0.25 inches.

3. The patching module of claim 1, wherein the housing is made of a dielectric material.

4. The patching module of claim 1, wherein the housing includes at least one snap-fit connection configured to secure the housing to a chassis.

5. The patching module of claim 1, further including a switching device for changing a circuit configuration of the first and second longframe jack assemblies between a no-normal configuration, a full-normal configuration, and a half-normal configuration.

6. The patching module of claim 5, wherein the switching device includes a plurality of two-position switches.

7. The patching module of claim 1, further including a rear connector electrically connected to the first and second longframe jack assemblies.

8. The patching module of claim 7, wherein the rear connector is electrically connected to the first and second longframe by a printed circuit board.

9. A patching system, comprising:
- a chassis having a front and a rear, the front defining a front opening;
- a plurality of front-loaded patching modules positioned within the front opening of the chassis, each of the patching modules including only two longframe jack assemblies, the two longframe jack assemblies including:
  - a first longframe jack assembly; and
  - a second longframe jack assembly; and
- a plurality of rear connectors located at the rear of the chassis, the rear connectors being electrically connected to the front-loaded patching modules.

10. The patching system of claim 9, wherein each of the patching modules includes a housing defining a first port and a second port, the first and second ports being sized to receive a longframe patch cord plug.

11. The patching system of claim 10, wherein the first longframe jack assembly is positioned adjacent to the first port, and the second longframe jack assembly is positioned adjacent to the second port.

12. The patching system of claim 10, wherein each of the first and second ports has a diameter of approximately 0.25 inches.

13. The patching system of claim 10, wherein the housing is made of a dielectric material.

14. The patching system of claim 10, wherein the housing includes at least one snap-fit connection configured to secure the patching module within the front opening of the chassis.

15. The patching system of claim 9, wherein each of the plurality of front-loaded patching modules has a center-to-center spacing equal to or less than 0.5 inches.

16. The patching system of claim 15, wherein each of the plurality of front-loaded patching modules has a center-to-center spacing equal to or less than 0.4 inches.

17. The patching system of claim 9, wherein the plurality of front-located patching modules includes at least 30 patching modules positioned within the front opening of the chassis.

18. The patching system of claim 17, wherein the plurality of front-loaded patching modules includes at least 32 patching modules positioned within the front opening of the chassis.

19. The patching system of claim 9, wherein the front of the chassis defines a front height, and the front opening of the chassis defines an opening height, the ratio of the front height to the opening height being no more than 1.8 to 1.

20. The patching system of claim 19, wherein the front of the chassis defines a front height, and the front opening of the chassis defines an opening height, the ratio of the front height to the opening height being no more than about 1.4 to 1.

21. The patching system of claim 9, wherein the chassis is configured to occupy at most one rack unit of a telecommunications rack.

22. The patching system of claim 21, wherein the front opening of the chassis is has a front opening height equal to or greater than about 1.25 inches.

* * * * *